(12) United States Patent
Toniolo

(10) Patent No.: US 6,315,799 B1
(45) Date of Patent: Nov. 13, 2001

(54) AUTOMATIC DEVICE FOR REPLACING GRINDING WHEELS IN MACHINES FOR PROFILING AND POLISHING WORKS OBTAINED FROM SLABS OF MARBLE, GRANITE STONE, GLASS, STONEWARE, CEMENT AND THE LIKE

(76) Inventor: Romeo Toniolo, Via Pastrengo, 21, 21054 Fagnano Olona VA (IT)

( * ) Notice: Subject to any disclaimer, the term of this patent is extended or adjusted under 35 U.S.C. 154(b) by 0 days.

(21) Appl. No.: 09/431,707

(22) Filed: Nov. 1, 1999

(30) Foreign Application Priority Data

Nov. 9, 1998 (IT) .............................................. MI98A2425

(51) Int. Cl.⁷ ...................................................... B24B 7/00
(52) U.S. Cl. ............................ 751/65; 451/72; 29/402.03; 29/402.08
(58) Field of Search .................... 451/65, 72; 29/402.08, 29/402.03

(56) References Cited

U.S. PATENT DOCUMENTS 5,989,105 * 11/1999 Kawakawaguchi et al. .
6,086,458 * 7/2000 Miyamoto et al. .
6,086,461 * 7/2000 Williams et al. .

* cited by examiner

Primary Examiner—Timothy V. Eley
Assistant Examiner—Willie Berry, Jr.
(74) Attorney, Agent, or Firm—Baker Botts L.L.P.

(57) ABSTRACT

In a machine for profiling and polishing works of marble and the like, it is possible to automatically replace one grinding wheel with another one in any working step whatsoever. On the same carriage (C) bearing the spindle, is fitted a device (R) consisting of a turning plate (25) provided with recesses, having wedge-shaped internal edges (29a), onto which are carried the replacement grinding wheels fixed to a coupling head (30). The turning plate (25) is made to approach the spindle (13), it withdraws the grinding wheel, complete with its attachment, to be replaced, once the spindle has been detached from the attachment, it turns by one or more steps to present a new grinding wheel with its corresponding attachment, and it is withdrawn to a waiting position until the next replacement.

7 Claims, 6 Drawing Sheets

AUTOMATIC DEVICE FOR REPLACING GRINDING WHEELS IN MACHINES FOR PROFILING AND POLISHING WORKS OBTAINED FROM SLABS OF MARBLE, GRANITE STONE, GLASS, STONEWARE, CEMENT AND THE LIKE

BACKGROUND OF THE INVENTION

The present invention relates to a device for quickly and automatically replacing grinding wheels in machines for profiling and polishing works obtained from slabs of marble, granite, stone, glass, stoneware, cement and the like.

In the presently commercially available machines having operating a single spindle, the replacement of the grinding wheel is carried out manually, as and when required, resulting in evident waste of time and labour.

Automatic grinding wheel replacement systems are also available which, however, replace the grinding wheels away from the working site. In this latter case, even if there is a saving in labour, a considerable waste of time and an additional stress on the machine are involved since the carriage bearing the operating spindle must be withdrawn from the working site so as to always be brought to the same initial or starting position where the grinding wheel replacement station is arranged.

SUMMARY OF THE INVENTION

The scope of the invention is to provide a device for automatically replacing a grinding wheel on its operating spindle, in any working step, at an end region of an active coarse profiling or polishing run, so as to prevent the carriage from being withdrawn to a fixed starting position, i.e. a longitudinal axis zero position, thereby achieving a great saving of the operating time, wear of the machine, and production cost since it is not necessary to control the longitudinal carriage position by very accurate and expensive electronic controls, as well as thanks to a less labour requirements for the user deriving from the automatic grinding wheel replacement.

Moreover, the device according to the invention must be able to be fitted onto any machine whatsoever even if of a technologically obsolete type.

According to the invention, on the same carriage bearing the operating spindle, is fitted a device consisting of ah horizontally arranged contoured circular turning plate having a plurality of peripheral fork-like recesses with parallel sides and a semicircular bottom, the peripheral edge whereof has a wedge-shaped cross-section.

In the forked recesses of the turning plate is preloaded a series of grinding wheels screw engaged with a composite coupling head to be used for the subsequent grinding wheel replacements.

Said coupling head has a substantially reel-like configuration, having a top and a bottom flange between which a sliding collar can move axially, said collar being pressed towards the top flange by a counterbiassing spring. The sliding collar, in its normal rest position, urges one or more balls to project into the seat of the driving spindle of the machine, said balls engaging an anular groove of the spindle so as to maintain in an axially locked state the coupling head.

Between the top surface of the spring loaded sliding collar and the top flange a clearance is provided into which can be in turn inserted the empty fork of the turning plate which, when urged against the coupling head bearing the operating grinding wheel arranged on the spindle, causes its wedge-shaped peripheral edge to release said balls thereby unlocking the spindle.

Thus, the spindle can be withdrawn leaving on the empty fork of the turning plate the proviously used grinding wheel whereas, upon rotating the turning plate through one or more steps, the spindle can be engaged, by a reverse operation, with a new grinding wheel which will remain automatically fixed to the spindle upon the withdrawal of the turning plate causing the balls to again engage the spindle groove.

To perform the feeding and the withdrawing displacements, the turning plate is mounted on a horizontal slide in turn set on a plate integral with the profiling and polishing machine carriage, whereas the alternating engagement and disengagement movements of a grinding wheel together with its coupling head are carried out by moving the spindle by any suitable driving means, such as a pneumatic piston.

All the displacements of the above mentioned members can be controlled by any known means, for example by processors programmed according to known programming methods in order to allow said displacements to be performed within the required periods of time and with the required sequences.

BRIEF DESCRIPTION OF THE DRAWINGS

The invention shall be better illustrated by the following description, having reference to the herewith enclosed drawings wherein.

DESCRIPTION OF THE PREFERRED EMBODIMENTS

Figure 1:
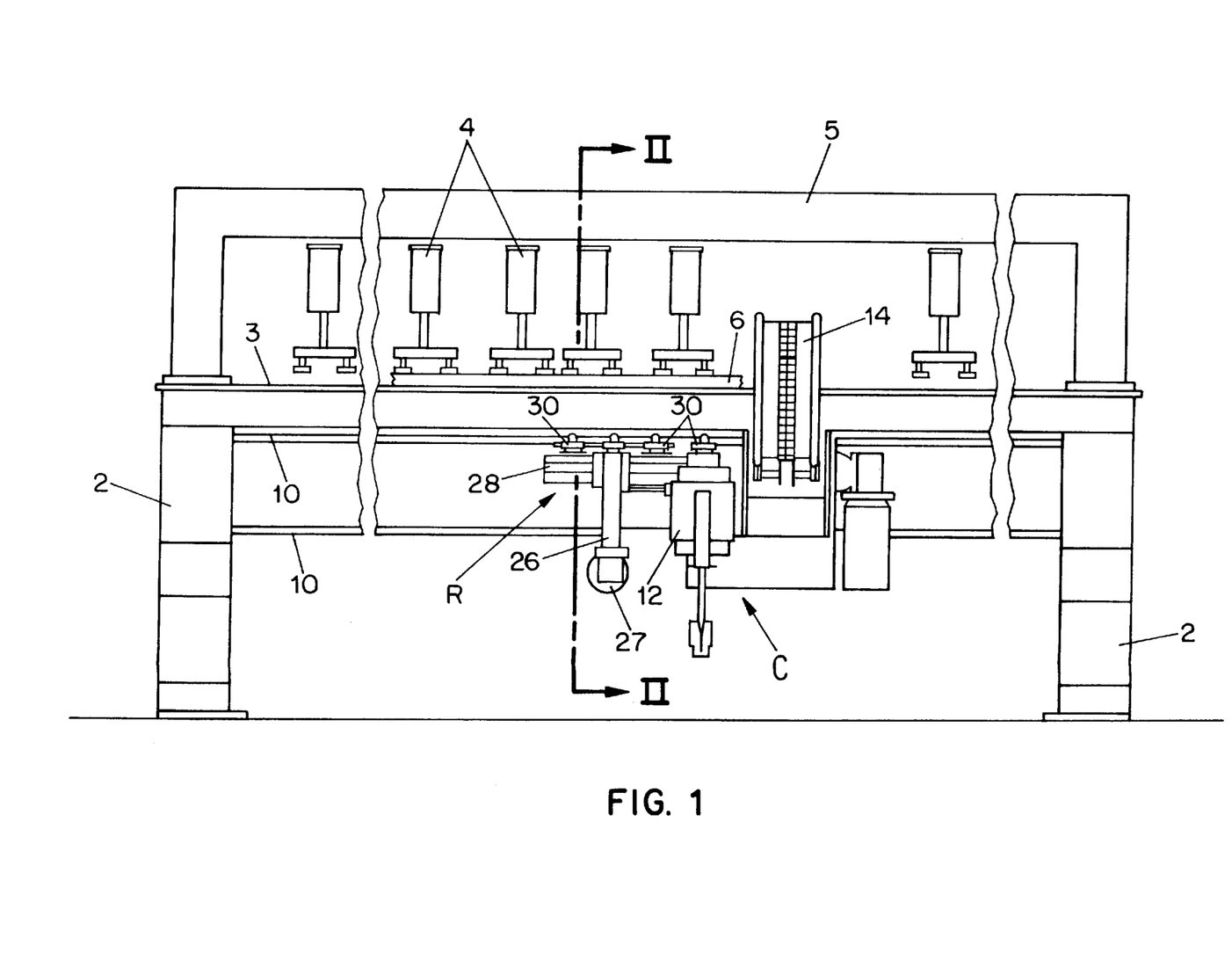
FIG. 1 is a schematic front elevation view illustrating the overall construction of a marble slab profiling and polishing machine including the device according to the invention.
Figure 2:
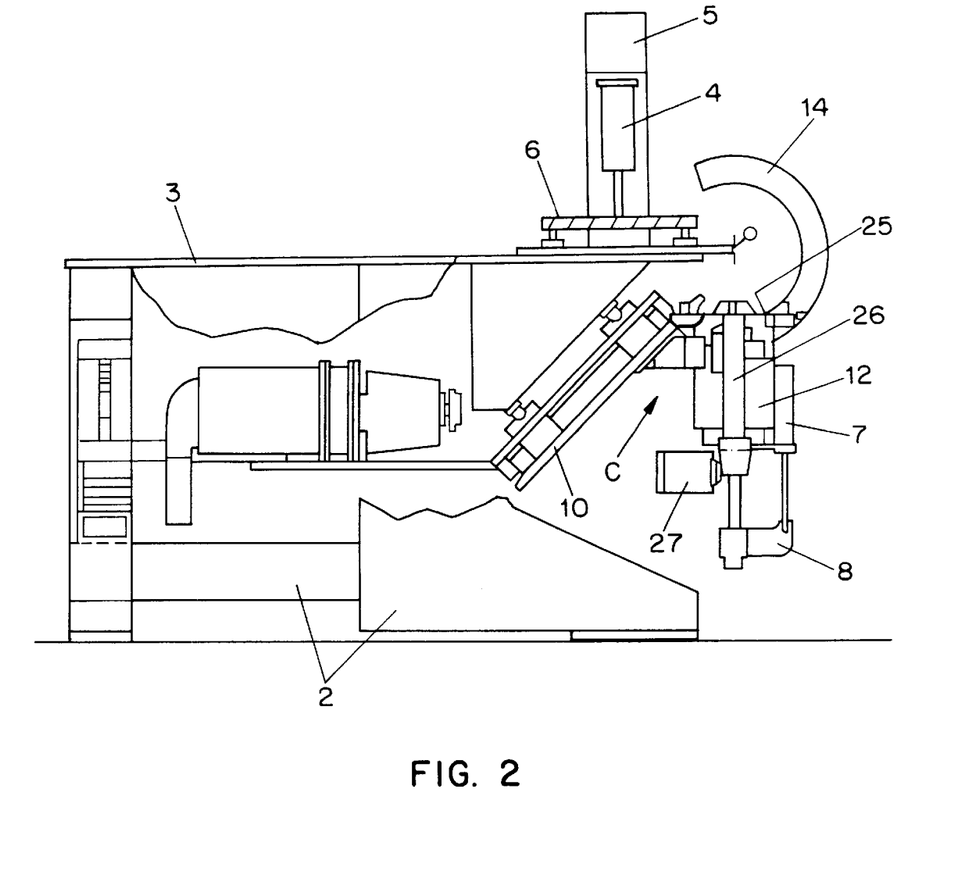
FIG. 2 is a schematic cross-sectional view, taken along the line II—II, of the profiling machine of FIG. 1.

As shown in FIGS. 1 and 2, the machine for profiling and polishing slabs of marble, stoneware, cement and the like consists of a strong longitudinally extending framework 2, bearing a horizontal working surface 3, on which is locked, by pneumatic systems 4 mounted on a top front cross member 5, a slab of material 6 the end edge of which must be worked to a flat or contoured profile.

Figure 6:
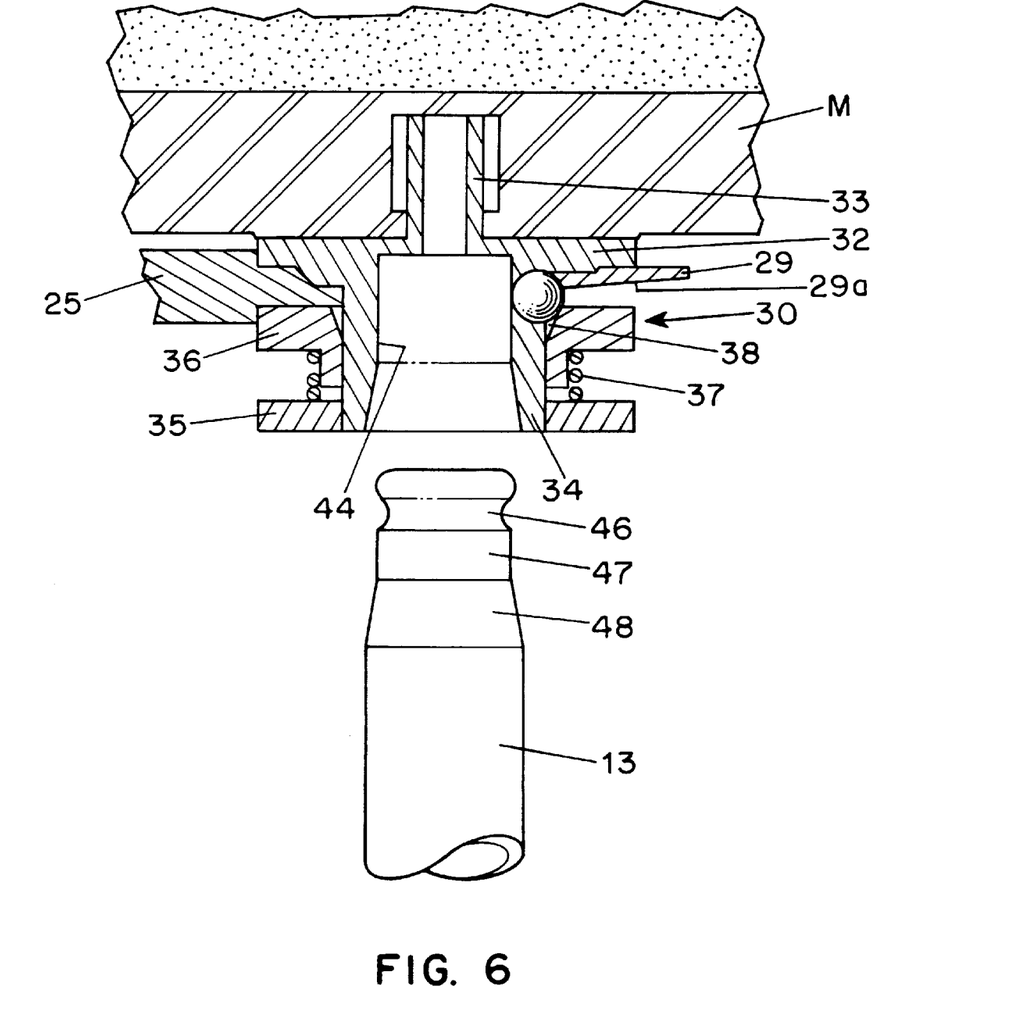
FIG. 6 is a cross-sectional view illustrating the coupling head for automatically engaging and disengaging the grinding wheels, according to the invention, with the spindle bearing the grinding wheel being disengaged.
Figure 7:
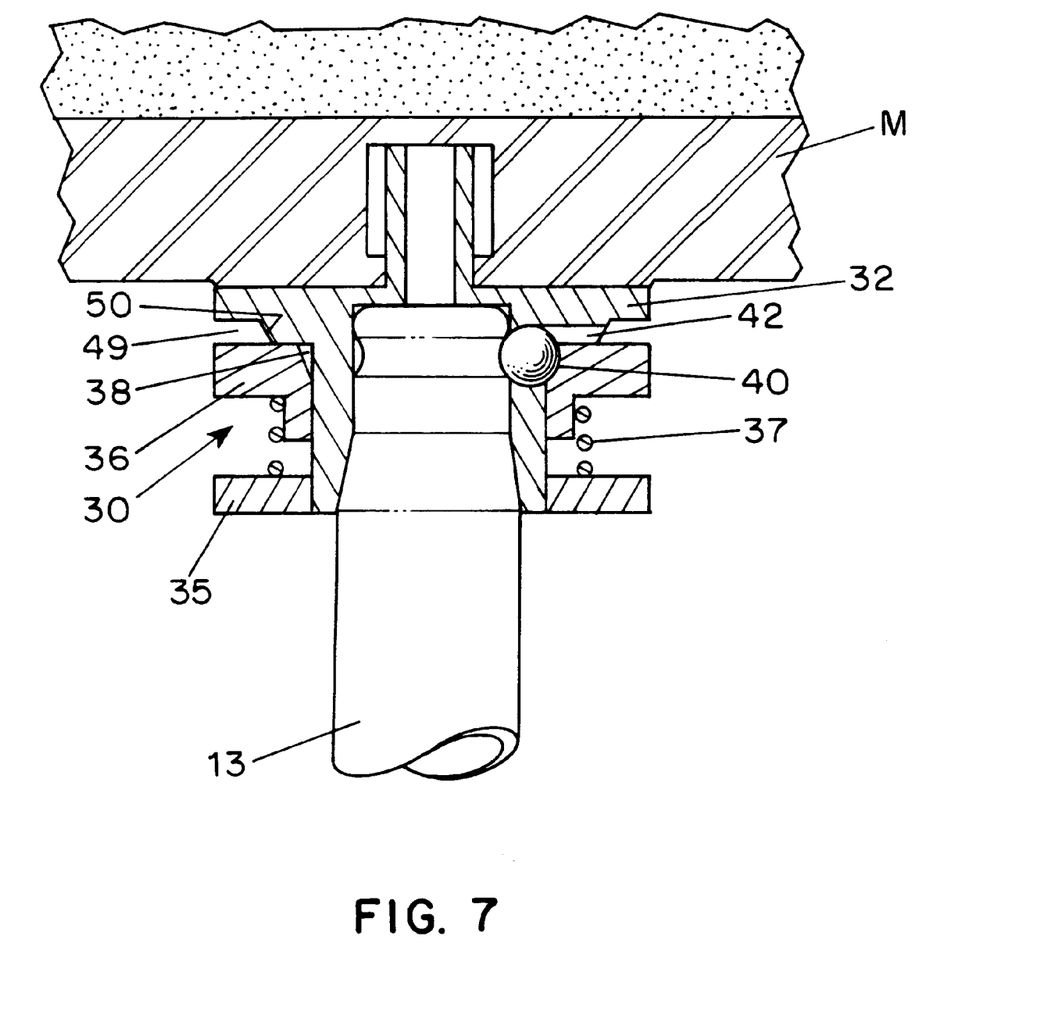
FIG. 7 is a cross-sectional view illustrating that same coupling head in its working condition, i.e. with the grinding wheel having been replaced and the rotary spindle being in an engaged condition.

As is known, prior profiling and polishing machines are provided with a carriage C sliding longitudinally on a set of robust guides 10, said carriage including a motor assembly 12 the shaft of which bears a spindle 13 to one end of which is fixed a grinding wheel M (see FIGS. 6 and 7).

The motor assembly 12 can be driven, in a per se known manner, through at least 180° on the vertical plane, by sliding on a semicircular guide 14 fixed to the carriage C, with center O coinciding with the middle line of the pattern to be attained. The guide 14 (see FIG. 3) includes a pair of rails 16 whereon V-grooved small rollers 18 integral with the motor assembly 12 are engaged, the movement of the motor assembly being provided by any known method, such as, for example, by a rack 19 whereon is engaged a gear 20 in turn driven by a small independent motor.

The replacement of the grinding wheels, which at present is generally performed manually by causing the carriage C to be withdrawn towards the left end portion of the framework 2 (see FIG. 1), is carried out automatically, according to the instant invention, thereby saving time and labour, in any positions whatsoever of the active working run, i.e. at the working step of the grinding wheel.

Figure 3:
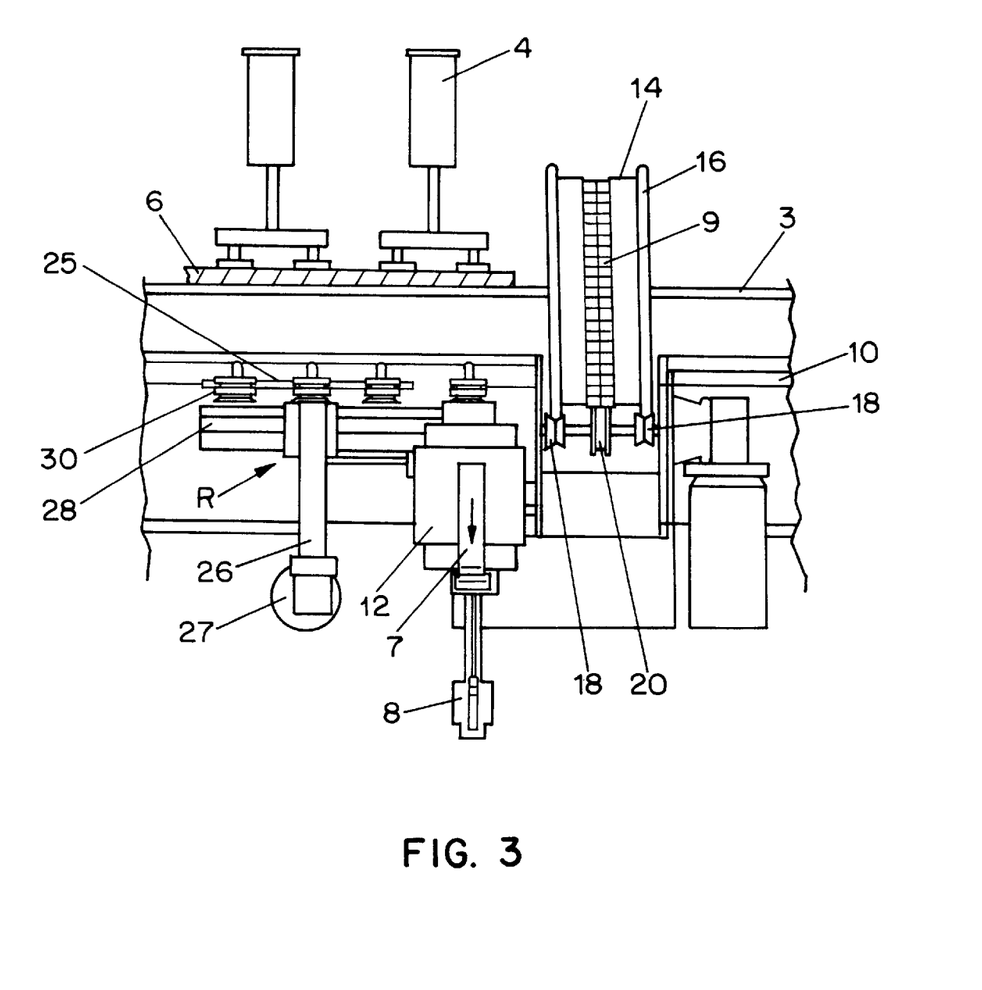
FIG. 3 illustrates, on an enlarged scale, the working carriage of the profiling machine, sliding longitudinally along the overall extension of the machine, the automatic grinding wheel replacement device according to the invention being linked with said carriage.

As is more clearly shown in FIG. 3, according to the instant invention on the carriage C is mounted a device R consisting of an horizontally arranged turning plate 25 (FIG. 4) which can rotate on a shaft 26 step-by-step driven by a driving motor 27. The turning plate 25 and its supporting shaft 26 assembly can be driven longitudinally of the machine on guides 28 which allow the turning plate to approach and move away from the motor assembly 12, the rotary shaft whereof bears, at its end, a spindle 13 suitable for receiving a grinding wheel.

Figure 4:
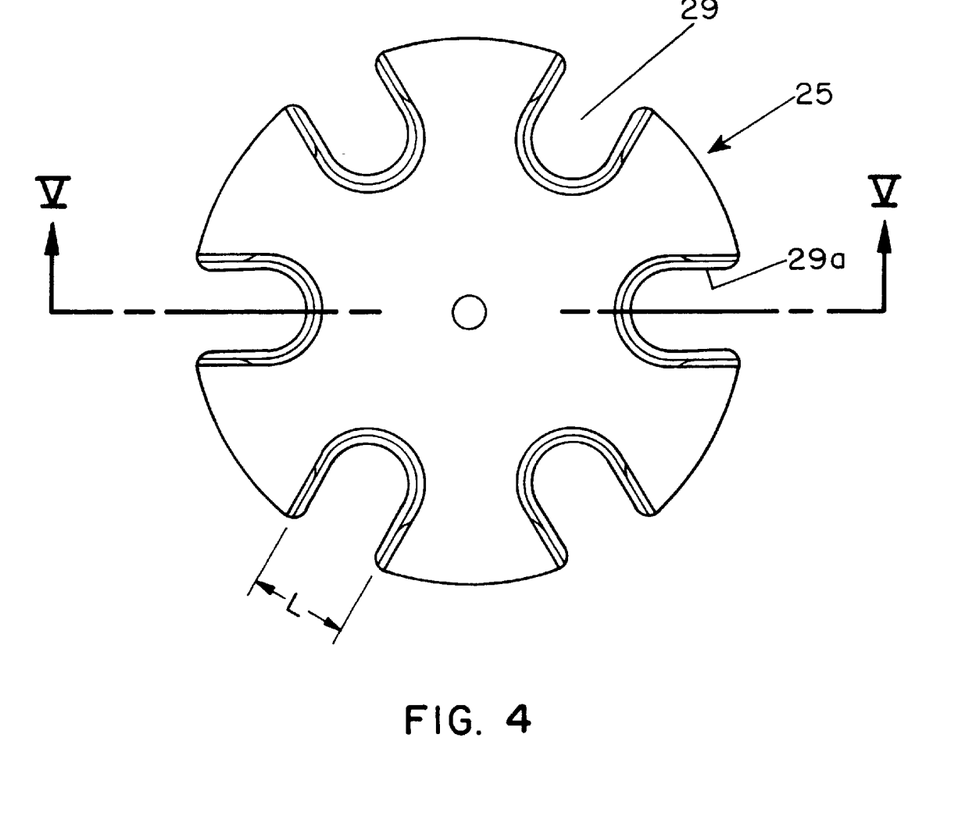
FIG. 4 is a top plan view illustrating the conformation of the turning plate bearing the replacement grinding wheel, according to the invention.

The turning plate 25 presents a plurality of fork-like recesses 29, for example six recesses, having an opening width L depending on the size of a coupling head 30 provided for mounting the grinding wheels on the spindle 13, as will be described hereinafter.

The coupling head 30 for automatically replacing the grinding wheels is shown in FIGS. 6 and 7.

Said coupling head is made of a disc 32 the top of which is integral with a threaded tang 33 for removably fitting thereon the grinding wheel M.

The disc 32 is provided underneath with a cylindrical hub 34, on the bottom end portion of which a flange 35 is attached, for example by means of a threaded type of coupling.

On the bottom cylindrical portion of the hub 34 is slidably engaged a collar 36, which is urged by a spring 37 bearing on the flange 35.

At its rest position, as shown in FIG. 7, the spring loaded collar 36 rests under the disc 32 of the coupling head 30. Said collar 36 presents at its top a conic tapering portion 38, thus causing at least one or more balls 40, arranged in radially extending channels 42, to project towards the inner cavity 44 of the coupling head so as to axially lock the spindle 13, provided with an annular groove 46, when inserted into said inner cavity 44. To achieve a perfect locking and centering, the spindle 13 is provided in its upper part with a cylindrical portion 47 coupled, through conical section 48, with the body of the spindle 13.

Figure 5:
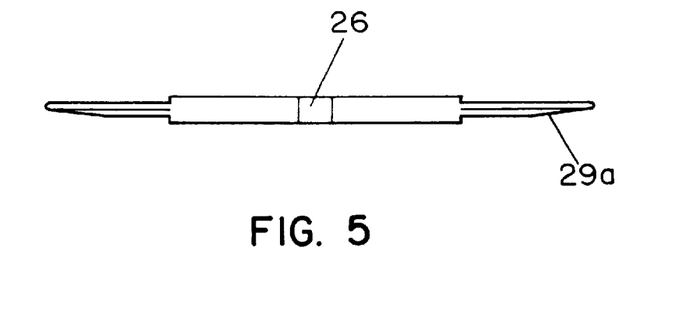
FIG. 5 is a cross-sectional view of the turning plate taken along the section line V—V— of FIG. 4.

In order to allow a worn grinding wheel to be removed from the spindle 13 and replaced by a new grinding wheel, the bottom portion of the disc 32 of the coupling head 30 presents a peripheral recess or cut-out 49 having a downward converging conical shoulder 50, thereby providing a lead-in groove around the coupling head 30, in which one of the empty forks 29 provided on the peripheral edge of the turning plate 25 can in turn be inserted. From FIG. 6 it can be taken that each fork, as a result of the wedge-like configuration 29a of its edges, as shown in FIG. 5, when engaged in the cut-out 49 of the coupling head 30, will cause the spring loaded collar 36 to be downwardly displaced after overcoming the resilient urging force of the spring 37, thereby causing the balls 40 to be radially moved away and the spindle 13 to be downwardly disengaged, whereby the worn grinding wheel in an empty fork of the turning plate 25 is released.

The vertical displacement for disengaging the spindle 13 is sequentially performed, at set times, by any known means, for example by a processor controlling the actuation of a piston 7 (see FIGS. 2 and 3) coupled, through a crank attachment 8, to the shaft of the motor assembly 12, once the turning plate 25 has been driven against the coupling head 30 of the grinding wheel still engaged with the spindle 13.

The mounting of the new grinding wheel, which is always performed through the motor assembly 12 and with its mandrel supporting shaft arranged vertically, contemplates the rotation of the turning plate 25 through one or more steps in order to bring a new grinding wheel M to a vertical alignment with the spindle 13, the upward drive of the spindle 13, for its engagement with the seat of the coupling head 30 and then the removal of the turning plate 25 from the spindle 13.

What is claimed is:

1. A machine for profiling and polishing works obtained from slabs of material, comprising:
   longitudinally extending guides;
   a carriage longitudinally movable on said guides;
   a motor assembly supported on said carriage for rotatably driving a spindle adapted to have a working grinding wheel (M) mounted thereon;
   a guide on said carriage for supporting said motor assembly for displacement in a vertical direction;
   a grinding wheel automatic mounting and dismounting device carried by said carriage, said device including
   (1) a horizontally arranged turning plate;
   (2) a vertically aligned shaft for rotatably supporting said turning plate;
   (3) at least one replacement grinding wheel (M) carried by said turning plate, said at least one grinding wheel (M) having a coupling head; and
   a guide supporting said vertically aligned shaft and said turning plate for movement towards and away from said motor assembly and said spindle, to automatically pick up and remove a worn grinding wheel (M) mounted on said spindle and replace said worn grinding wheel (M) with a fresh grinding wheel (M) with said motor assembly being in a vertical position and said spindle being parallel to said shaft.

2. A machine according to claim 1, wherein said turning plate is provided with a plurality of peripheral fork-like recesses having inner edges with a wedge-like shape, said recesses having a clearance width (L) corresponding to the size of said coupling head, each said fork-like recess being adapted to removably support a working grinding wheel (M).

3. A machine according to one of claim 1 and 2, wherein:
   said horizontally arranged turning plate is rotated, step by step, on said vertical shaft; and
   said grinding wheel mounting and dismounting device further comprises a motor for rotatably driving said shaft.

4. A machine according to one of claims 1 and 2, wherein each said coupling head comprises a disc including, at a top thereof, a threaded tang for removably mounting a grinding wheel (M) and, at a bottom thereof, a cylindrical hub on which a collar is slidably coupled, and a spring bearing on a flange at the bottom end of said hub and urging said collar towards said disc.

5. A device according to one of claims 1 and 2, wherein said spindle is axially displaced by a driving piston coupled, through a crank attachment, to said motor assembly.

6. A machine according to claim 4, wherein said collar, which normally bears under said disc of said coupling head, is provided with a top conical tapering portion causing at least one or more balls, arranged in radially extending channels formed on the bottom of said disc, to project into an inner cavity of said hub so as to axially lock said spindle within said coupling head, said spindle being provided with an annular groove at a point at which said balls project into said inner cavity of said hub.

7. A machine according to claim 6, wherein the bottom portion of said disc of said coupling head has a peripheral cutout having a downward converging conical shoulder to provide a lead-in groove running along said coupling head, said groove being engageable with one of the forks of said turning plate, said fork, due to the wedge like configuration of said inner edges thereof, causing said spring biased collar to be lowered, thereby allowing the balls locking the spindle to be radially disengaged from the annular groove of said spindle, whereby said spindle can be lowered and a worn grinding wheel (M) can be released in an empty fork of said turning plate.

* * * * *

UNITED STATES PATENT AND TRADEMARK OFFICE
CERTIFICATE OF CORRECTION

PATENT NO. : 6,315,799 B1  Page 1 of 1
DATED : November 13, 2001
INVENTOR(S) : Romeo Toniolo It is certified that error appears in the above-identified patent and that said Letters Patent is hereby corrected as shown below:

Column 1,
Line 38, "thanks to a" should be deleted
Line 45, "ah" should read -- a --
Line 60, "anular" should read -- annular --

Column 2,
Line 5, "proviously" should read -- previously --

Column 3,
Line 29, "whereof" should read -- of the motor assembly 12, which --

Column 6,
Line 8, "wedge like" should read -- wedge-like --

Signed and Sealed this

First Day of April, 2003

JAMES E. ROGAN
*Director of the United States Patent and Trademark Office*